United States Patent [19]
Voigt et al.

[11] Patent Number: 5,936,014
[45] Date of Patent: Aug. 10, 1999

[54] BIODEGRADABLE DEFORMABLE THERMOPLASTIC MATERIALS AND PACKAGES MADE THEREOF

[75] Inventors: Hans-Dieter Voigt, Halle; Manfred Gehring, Trier; Christel Rom, Halle; Dieter Weiwad, Halle; Inno Rapthel, Halle; Rolf Kakuschke, Bad Lauchstädt; Kerstin Reichwald, Halle, all of Germany

[73] Assignees: Buna Sow Leuna Olefinverbund GmbH, Schkopav; Reynolds Tobacco GmbH, Köln, both of Germany

[21] Appl. No.: 08/860,427

[22] PCT Filed: Dec. 6, 1995

[86] PCT No.: PCT/DE95/01732

§ 371 Date: Jun. 6, 1997

§ 102(e) Date: Jun. 6, 1997

[87] PCT Pub. No.: WO96/17888

PCT Pub. Date: Jun. 13, 1996

[30] Foreign Application Priority Data

Dec. 7, 1994 [DE] Germany .............................. 44 43 539
May 27, 1995 [DE] Germany ............................ 195 19 495

[51] Int. Cl.$^6$ ...................................................... C08L 3/06
[52] U.S. Cl. ................................................................ 524/51
[58] Field of Search ................................................ 524/51

[56] References Cited

U.S. PATENT DOCUMENTS

| | | |
|---|---|---|
| 4,137,280 | 1/1979 | Dixon et al. . |
| 4,405,731 | 9/1983 | Carter, Jr. ................................... 524/51 |
| 5,379,889 | 1/1995 | Cobler . |
| 5,462,983 | 10/1995 | Bloembergen et al. ................... 524/51 |

FOREIGN PATENT DOCUMENTS

| | | |
|---|---|---|
| 0087483 | 9/1983 | European Pat. Off. . |
| 0317818 | 5/1989 | European Pat. Off. . |
| 0454003 | 12/1993 | European Pat. Off. . |
| 3027448 | 2/1982 | Germany . |
| 2844238 | 8/1984 | Germany . |
| 3414214 | 10/1985 | Germany . |
| 3632376 | 3/1988 | Germany . |
| 4114185 | 2/1993 | Germany . |
| 4226640 | 2/1994 | Germany . |
| 4326118 | 2/1995 | Germany . |
| 4418678 | 11/1995 | Germany . |
| WO-A-0947953 | 4/1994 | WIPO . |

OTHER PUBLICATIONS

Database WPI Week 9312, Derwent Publications Ltd., London, GB; AN 96870 & JP–A–05,039,412 (Calp Kogyo KK), Feb. 19, 1993.

*Primary Examiner*—Melvyn I. Marquis
*Attorney, Agent, or Firm*—Horst M. Kasper

[57] ABSTRACT

Biodegradable thermoplastic materials made of blends of starch esters and polyalkylene glycols with additions of polybasic aliphatic carboxylic acids and oxycarboxylic acids are improved with respect to water stability and mechanical characteristics and barrier properties by admixing to the blends aliphatic polycarbonates at levels of from 5:95 to 95:5 with the optional addition of ecologically compatible plasticizers and fillers.

These materials can be used for all goods which are to be packaged in films, in particular tobacco products, but also soap, paper tissues, toilet articles, and the like. In addition to biodegradability, said materials are characterized in that they may be fed to a special recycling process, but also to conventional recycling processes without adversely affecting them.

19 Claims, 3 Drawing Sheets

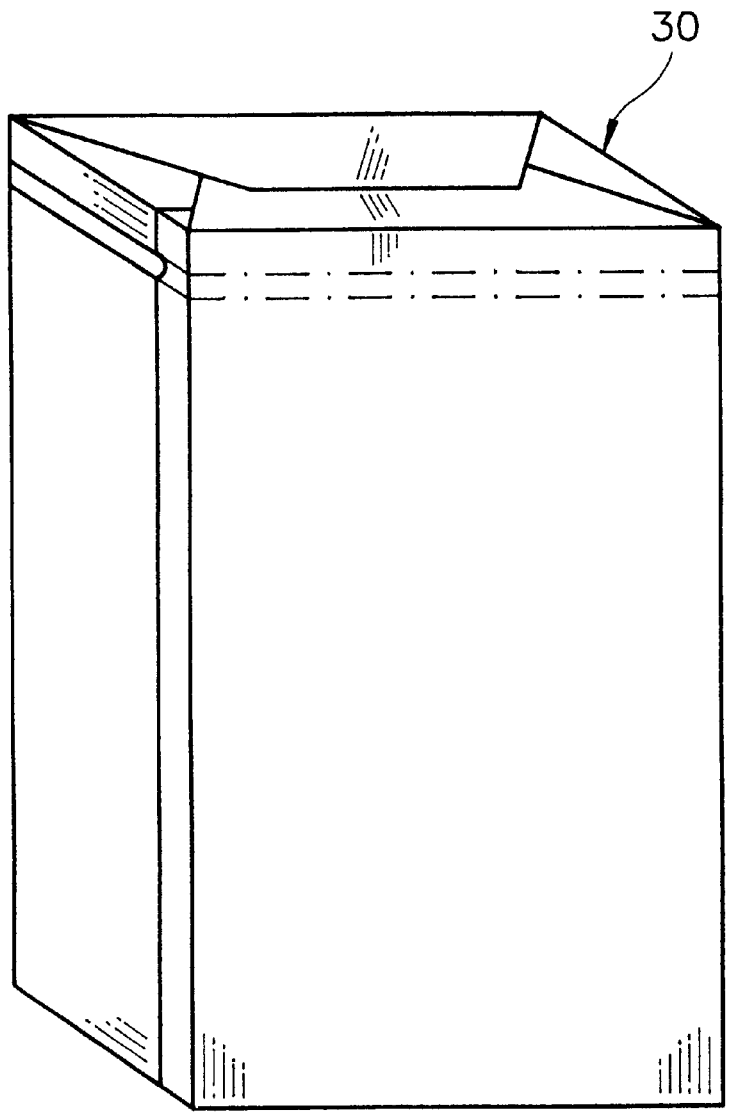
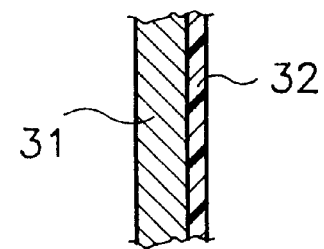
Fig.4
Fig.3

BIODEGRADABLE DEFORMABLE THERMOPLASTIC MATERIALS AND PACKAGES MADE THEREOF

FIELD OF THE INVENTION

The invention relates to thermoplastic materials made of biodegradable polymer blends in the form of granule, molded parts, extrudates, films, etc. based on a blend consisting of starch esters, polyalkylene glycols and other biocompatible additives, the use thereof, and a package made of said biodegradable thermoplastic materials.

BACKGROUND OF THE INVENTION

As environmental problems continue to grow, there is an increased need for ecologically compatible materials on the polymer market. Attempts to take account thereof have resulted in the use of products from fermentatively produced polyesters, polyvinyl alcohols, starch and starch derivatives with a low degree of substitution, cellulose and cellulose derivatives as well as blends of these with conventional plastics, such as polyethylene. Those materials have a drawback in that they have insufficient durability, inferior mechanical properties, and, especially in the case of blends with conventional plastics, they are but incompletely biodegradable. Using derivatized starch, especially with a higher degree of substitution and modified with appropriate biodegradable plasticizers (DE 41 14 185), materials were achieved which are readily processed thermoplastically and are useful for injection molding, melt-spinning or the preparation of films. However, these materials are known to become brittle again rather soon.

According to the German Laid-Open No. 43 26 118, such brittleness can be prevented by modifying starch esters with a degree of substitution of <3, preferably from 1.8 to 2.6, using polyethylene glycol (PEG). According to the German Laid-Open No. 44 18 678, it is possible to increase melt stabilization of blends from starch esters with a degree of substitution of <3 and polyalkylene glycols and to improve their biodegradability by the addition of aliphatic, saturated or unsaturated, dicarboxylic acids and/or oxydicarboxylic acids and/or oxytricarboxylic acids.

However, such blends have insufficient water stability and mechanical properties, in particular elongation at break, impact resistance, and barrier characteristics, particularly in the case of molding compositions which are to be processed by injection molding, deep drawing, melt-spinning and extruding, especially into films.

Packages for cigarettes and other tobacco products are known in a variety of designs and made of a number of rather different materials, such as pouches, cans and hinged-lid boxes made of aluminum, tin, cardboard or plastic. The most widely spread package for cigarettes is the hinged-lid box according to DEP 34 14 214 (U.S. Pat. No. 5,379,889). This package achieves the required protection of its contents by a multi layer combination of different materials. It frequently consists of an inner layer of backed or printed aluminum foil, a cardboard or paper layer which in most cases is printed with specifications, and an outer closed wrapping of a thermally weldable film, e.g. of polypropylene (German Laid-Open Nos. 30 27 448 and 28 44 238). Other packages for cigarettes achieve the required protection of their contents from deformation, flavor and humidity losses by the combination of other materials, such as tin (i.e. metal sheet) and paper according to EP 087 483.

However, packages have also been described which exclusively consist of films of thermoplastics (German Laid-Open No. 42 26 640).

In order to improve the mechanical properties and the gas and water vapor permeability of thermoplastic films used for cigarette packages, plastic films of polypropylene or polyalkylene terephthalate are used which have been oriented by biaxial stretching and may be metallized (German Laid-Open No. 36 32 276, EP 454 003, EP 317 818).

All these solutions have drawbacks in that protection of the contents as well as water vapor and gas tightness can only be achieved if materials are selected comprising at least one aluminum foil, tin foil, or biaxially stretched plastic film. The necessary specifications are printed mostly onto a cardboard, tin or paper wrapping used in said combination. These complex packages require considerable expenditures for their preparation as well as for the packing material employed in order to maintain the quality of the packaged goods and to ensure the appeal of the package.

After use, the packages usually go to the waste and therefore contribute to the existing environmental problems. They decompose but very slowly or not at all when under weathering actions on dumping grounds and in nature. Their being reprocessed in the usual recycling processes requires that the materials be first separated. Such separation can be performed but incompletely in general. Moreover, these processes are adversely affected, e.g. by contamination of the process water. Reuse of the packages is out of the question for food law reasons.

SUMMARY OF THE INVENTION

It is the object of the present invention to embody the features of the German Laid-Open Nos. 43 26 118 and 44 18 678 to greater advantage by improving the water stability, mechanical characteristics and barrier properties of the blends and to develop packages for good of various kinds consisting of one or more layers of films of thermoplastic materials which can be prepared without great technical expenditures, are light-weighted, have good barrier properties with respect to water vapor and gases without additional finishing or treatment, can be printed, and in addition are completely biodegradable, can be fed to a technical recycling process and will not adversely affect usual recycling processes.

This is solved by the invention which is defined by the claims.

BRIEF DESCRIPTION OF THE DRAWINGS

FIG. 3 shows a cigarette package made of cardboard material backed with the material according to the invention; and FIG. 4 shows a sectional view of the material of the package of FIG. 3.

DESCRIPTION OF THE INVENTION

Figure 1:
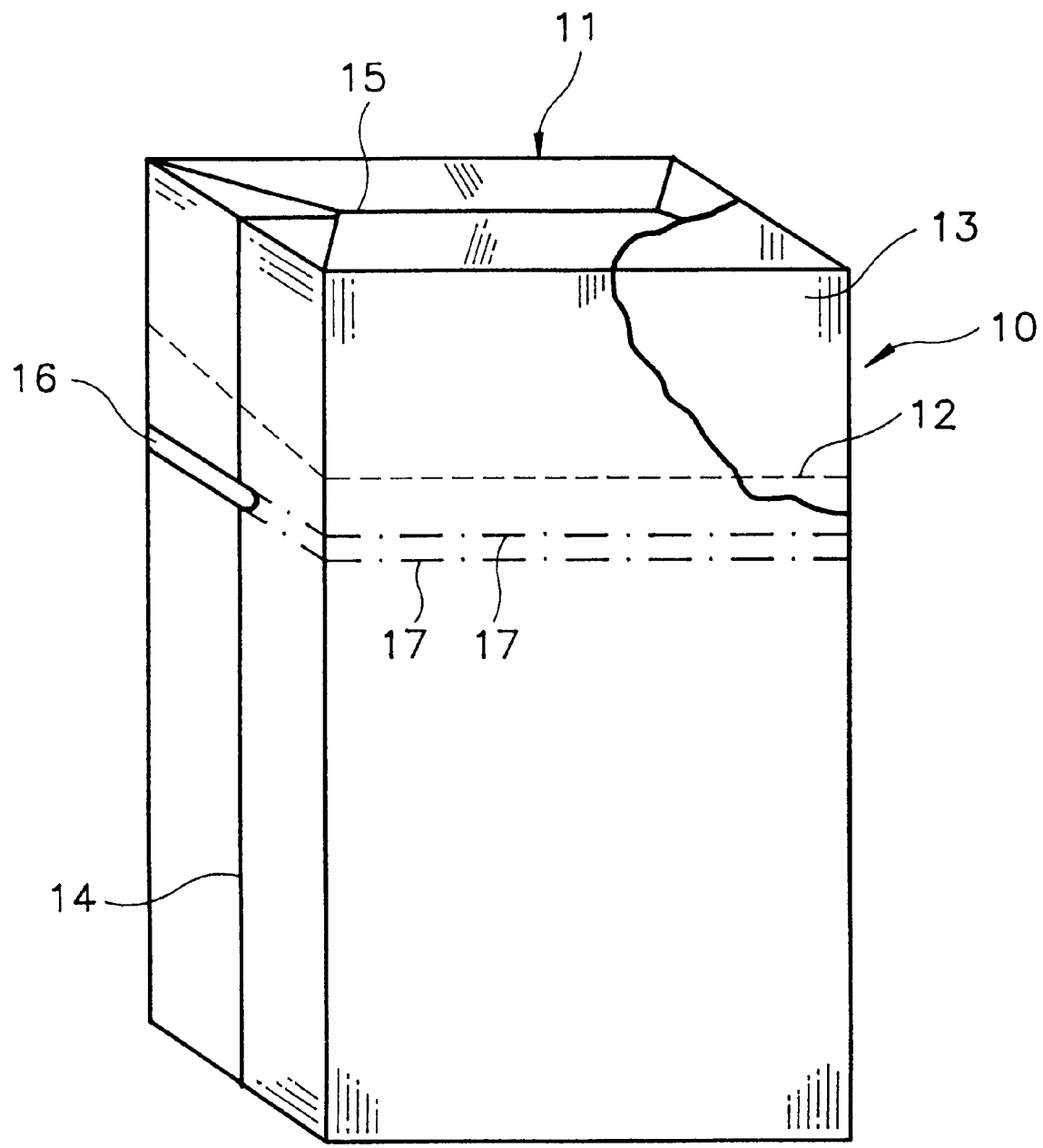
FIG. 1 shows a cigarette package with an inner cardboard package and an outer wrapping consisting of the film according to the invention.

The blends according to the invention comprise starch esters, mainly starch acetate, with a degree of substitution of <3, preferably from 1.8 to 2.6, and polyethylene glycols (PEGs) having molar masses of from 200 to 1000 g/mol, preferably from 200 to 600 g/mol, with or without addition of saturated dicarboxylic acids and/or oxydicarboxylic acids and/or oxytricarboxylic acids containing from 2 to 10 carbon atoms in a ratio of starch ester to polyfunctional carboxylic acid of from 100:2 to 1000:1, compounded with aliphatic polycarbonates and plasticizers as well as conventional additives, especially fillers.

Said aliphatic polycarbonates are polymers containing carbonic ester groups and having the formula

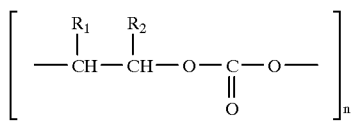

wherein $R_1$ and $R_2$ are hydrogen or straight or branched chain $C_1$ to $C_4$ alkyl groups and may be the same or different or may be linked to one another, and n equals 250–10,000, preferably 350–3000. The use of polyethylene and polypropylene carbonates is particularly preferred. Aliphatic polycarbonates may also be polyalkylene copolymers or terpolymers.

As plasticizers, biocompatible compounds are preferably considered, i.e., polyethylene glycols, monoesters and diesters of polyethylene glycols with $C_1$ to $C_{10}$ carboxylic acids, such as triethyleneglycol diacetate, glycerol triacetate, and citric acid trialkylester. Further, esters of phthalic acid with $C_1$–$C_{10}$ n-alkanols may be used, such as dimethyl phthalate, diethyl phthalate, or dibutyl phthalate. The ratio of starch acetate blend to aliphatic polycarbonates may be 5:95 to 95:5, preferably 30:70 to 70:30. The content of additives or plasticizers is from 0 to 30%, preferably from 0 to 15%.

These additives do not adversely affect the barrier properties and strength of the blends for packing materials.

For thermoplastic processing, it is particularly advantageous to premix starch acetate with a degree of substitution of <3 with polyalkylene glycol with the addition of dicarboxylic acids and/or oxydicarboxylic acids and/or oxytricarboxylic acids, to extrude this premix and make it into granules and then to process the granules with appropriate aliphatic polycarbonates and additives.

In this way, thermoplastically processable molding compositions for all of the usual processing methods, for example, injection molding, deep drawing, melt-extrusion etc., may be produced. These molding compositions are completely biodegradable and have increased water stability, good mechanical properties, especially with films, increased elongation at break, and good barrier properties with respect to gas and water vapor.

For surface design in terms of promotional appealing prints, up to 35%, based on the total mass, of suitable fillers, such as chalk, talcum, anhydrite or kaolin, may be admixed to the films. The concentration of fillers is preferred to be from 1 to 30% by weight.

Due to the good barrier properties of the films with respect to water vapor and gases, especially air, without additional treatment by biaxial stretching or metal vapor deposition, one-layer packages, in particular, may be advantageously realized. This may be common selling packages, additional outer packages, shipping packages, or even refilling packages for a system of reusable selling packages. The one-layer embodiment of the package saves high expenditures in terms of preparation costs and packing materials while still ensuring the whole protection of the quality of the packaged good. For packages which have to meet especially high mechanical demands, however, multi layer film cuts may also be employed which may have different compositions according to their position within the ensemble. The biodegradability and compostability of the claimed packing films is excellent such that they are completely decomposed upon storing under rotting conditions for several weeks.

When known processes for recycling these articles are used, no failures will occur.

The following examples illustrate the benefits of the blends according to the invention. The solid starting components of the respective composition were briefly premixed in a high-speed mixer. Then, the liquid plasticizers were added to give a powdery dry blend. This was processed into granules using an extruder which were subsequently either injection-molded into ISO bars (80 mm×10 mm×4 mm) or extruded into films.

TABLE 1 summarizes the base formulations selected for illustrating the results:

| Example | Stac [mass %] | PPC [mass %] | PEC [mass %] | PEG 400 [mass %] | Oxalic Acid [mass %] | Plast. II [mass %] |
|---|---|---|---|---|---|---|
| 1 (comp.) | 83.0[3] | — | — | 16.6 | 0.41 | — |
| 2 (inv.) | 68.6[3] | 13.7 | — | 17.2 | 0.48 | — |
| 3 (inv.) | 45.3[3] | — | 45.3 | 9.1 | 0.32 | — |
| 4 (inv.) | 39.8[3] | — | 39.8 | 16.0 | 0.40 | 4.0[1] |
| 5 (inv.) | 66.4[4] | 13.3 | — | 16.6 | 0.33 | 3.4[2] |
| 6 (inv.) | 30.7[4] | 20.0 | 40.0 | 6.1 | 0.20 | 3.0[2] |

Plast. II is
[1]dimethyl phthalate.
[2]triethylene glycol diacetate. The degree of acetylation of the starch was
[3]2.26 and
[4]2.24.
Stac = starch acetate
PEC = polyethylene carbonate
PPC = polypropylene carbonate
PEG = polyethylene glycol One particular advantage of the blends according to the invention is that fillers are readily incorporated and, in addition to the advantage in expenses, certain mechanical characteristics can be improved.

TABLE 2

Base Formulations with Fillers

| Example | Base formulation according to example | added fillers | percent |
|---|---|---|---|
| 7 (como.) | 1 | chalk | 10 |
|  |  | $TiO_2$ | 0.5 |
| 8 (inv.) | 6 | talcum | 11.3 |
|  |  | $TiO_2$ | 0.8 |
| 9 (inv.) | 6 | talcum | 13.0 |
|  |  | $TiO_2$ | 0.5 |
| 10 (inv.) | 6 | chalk | 12.9 |
|  |  | $TiO_2$ | 0.9 |

From compositions 1, 2, 3, 4, and 8, ISO bars were made and examined for mechanical characteristics.

TABLE 3

Mechanical Characteristics of ISO Bars

| Example | IR, kg/m² | FS, Mpa | Flexural Modulus, Mps | Tensile Strength at Break, Mpa | Tensile Strength at Break, Mpa | Elongation at Break, Mpa | BIH Nimm² |
|---|---|---|---|---|---|---|---|
| 1 | 3.2 | 35.1 | 1455 | 19.9 | 19.6 | 1.3 | 64 |
| 2 | 8.5 | 35.5 | 1140 | 29.6 | 15.1 | 13 | 48 |
| 3 | 16.8 | 17.7 | 666 | 17.8 | 7.1 | 20.5 | 15 |
| 4 | * | 3.6 | 137 | 6.5 | 4.3 | 700 | 7 |
| 5 | 35.4 | 20.7 | 1157 | 24.8 | 8.9 | 107 | 75 |

*100% unbroken, IR impact resistance, FS flexural strength (at conventional deflection), BIH ball indentation hardness 30"

It can be clearly seen that the characteristics may be varied within broad ranges, wherein especially composition 4 is not useful for injection molding. Such compositions are more useful for film applications.

TABLE 4

Mechanical Characteristics of Extruded Films

| Ex. | dir. | Tensile Strength Elongation Mpa | % | Tensile Strength at Break, MPa | Direction (?) elongation, % | thickness, mm | Permeation $H_2O$ vapor, $g/m^2d$ | pentane, $g/m^2d$ |
|---|---|---|---|---|---|---|---|---|
| 1 | 1 | 7.2 | 7.2 | 5.1 | 67.0 | 0.03 | 60.5 | 12.1 |
|   | t | 5.3 | 4.2 |     |      |      |      |      |
| 7 | 1 | 10.7 | 5.1 | 5.3 | 31.5 | 0.03 | 55.9 | 10.8 |
|   | t |     |     |     |      |      |      |      |
| 8 | 1 | 29.5 | 3.4 | 12.0 | 30.0 | 0.08 | 46.8 | 7.0 |
|   | t |     |     |     |      |      |      |      |
| 9 | 1 | 11.2 | 3.7 | 69 | 291.7 | 0.14 | 31.6 | 5.7 |
|   | t |     |     |     |      |      |      |      |
| 10 | 1 | 10.5 | 5.1 | 4.2 | 294.0 | 0.08 | 39.3 | 3.8 |
|    | t |     |     |     |      |      |      |      |

Measuring conditions

Width: 15 mm

Direction with respect to film feeding: 1 longitudinal, t transversal

Measuring length: 50 mm

Test speed: 100 mm/min initial force: 0.1 N

Examples of applications as packing materials

One-layer cigarette packages were prepared from different film cuts whose compositions of materials are listed in Table 5.

TABLE 5

Compositions of Materials

|  | 1 | 2 | 3 |
|---|---|---|---|
| starch acetate (degree of subst. = 2.4) | 48% | 30% | 26.1% |
| polypropylene carbonate (degree of polym. = 950) |  | 37.5% | 34.8% |
| polyethylene carbonate (degree of polym. = 1100) | 32% | 12.5% | 17.4% |
| plasticizers/aids | 20% polyalkylene glycol | 20% polyethylene glycol dioctate | 21.7% Dioctyl phthalate |

Dry blends of the components for examples 1 to 3 of Table 5 were processed into granules on an extruder and subsequently extruded or blown into films. In Table 6, the measured mechanical values and the permeation properties of the films are given.

TABLE 6

Mechanical Values and Permeation Properties

| Example | 1 | 2 | 3 |
|---|---|---|---|
| Film thickness (mm) | 0.04 | 0.08 | 0.060 |
| Tensile strength (Mpa) | 13.1 | 32.0 | 17.2 |
| Tensile strength at Break (Mpa) | 4.8 | 12.1 | 6.9 |
| Elongation at break (in film feeding direction, %) | 100.7 | 22.9 | 29.1 |
| Permeation of $H_2O$ vapor ($g/m^2d$) | 34 | 7.4 | 25.5 |

TABLE 6-continued

Mechanical Values and Permeation Properties

| Example | 1 | 2 | 3 |
|---|---|---|---|
| Permeation of pentane ($g/m^2d$) | 9.0 | 1.1 | 5.7 |
| Permeation of air ($cm^3/m^2d$) | 15.8 | 6.4 | 9.8 |

Film cuts from composition of materials according to examples 1 to 3 can be readily welded. The measured strength properties of the films demonstrate that the films are excellently suitable for tobacco products, especially for cigarette packages, and will protect the package contents from shipping damage and damage from storage and handling. The permeation values measured have been achieved without biaxial stretching of the films. For examining the biodegradability, empty packages having the above mentioned compositions were disposed in an industrial composting plant under rotting conditions. The condition of the packages was monitored weekly and the time was established after which the morphology of the film cut could no longer be recognized (Table 7).

TABLE 7

Rotting time (weeks)

| Example | 1 | 2 | 3 |
|---|---|---|---|
| Rotting time (weeks) | 8 | 14 | 12 |

In the following, examples of packages prepared from the material according to the invention are explained in more detail with reference to the drawings, taking cigarette packages as an example.

In the example of FIG. 1, an inner package 10 in the form of a conventional cigarette box made of cardboard material is provided. The cardboard material consists of a cellulose containing material, in particular the usual cardboard. Such material has a relatively high vapor permeability. The inner package 10 completely encloses the cigarettes contained therein. It has a conventional separation seam 12 or cutting seam in order that the lid 13 embodied as an upper cap may be lifted off.

Inner package 10 is enclosed by an outer package 11 made of the material according to the invention as set forth above. The outer package 11 consists of a thin, preferably transparent film which is wrapped around the inner package 10 and forms a fold along one narrow side. At the front faces, outer package 11 is sealed by folding 15. Further, a ripping strip 16 which runs once around the outer package 11 is provided which is bounded by two weakening lines 17. After ripping off said ripping strip 16, the upper cap part of said outer package 11 can be removed such that said inner package 10 is exposed for opening the lid. All seams and folds of the outer package 11 may be sealed vapor-tight.

Figure 2:
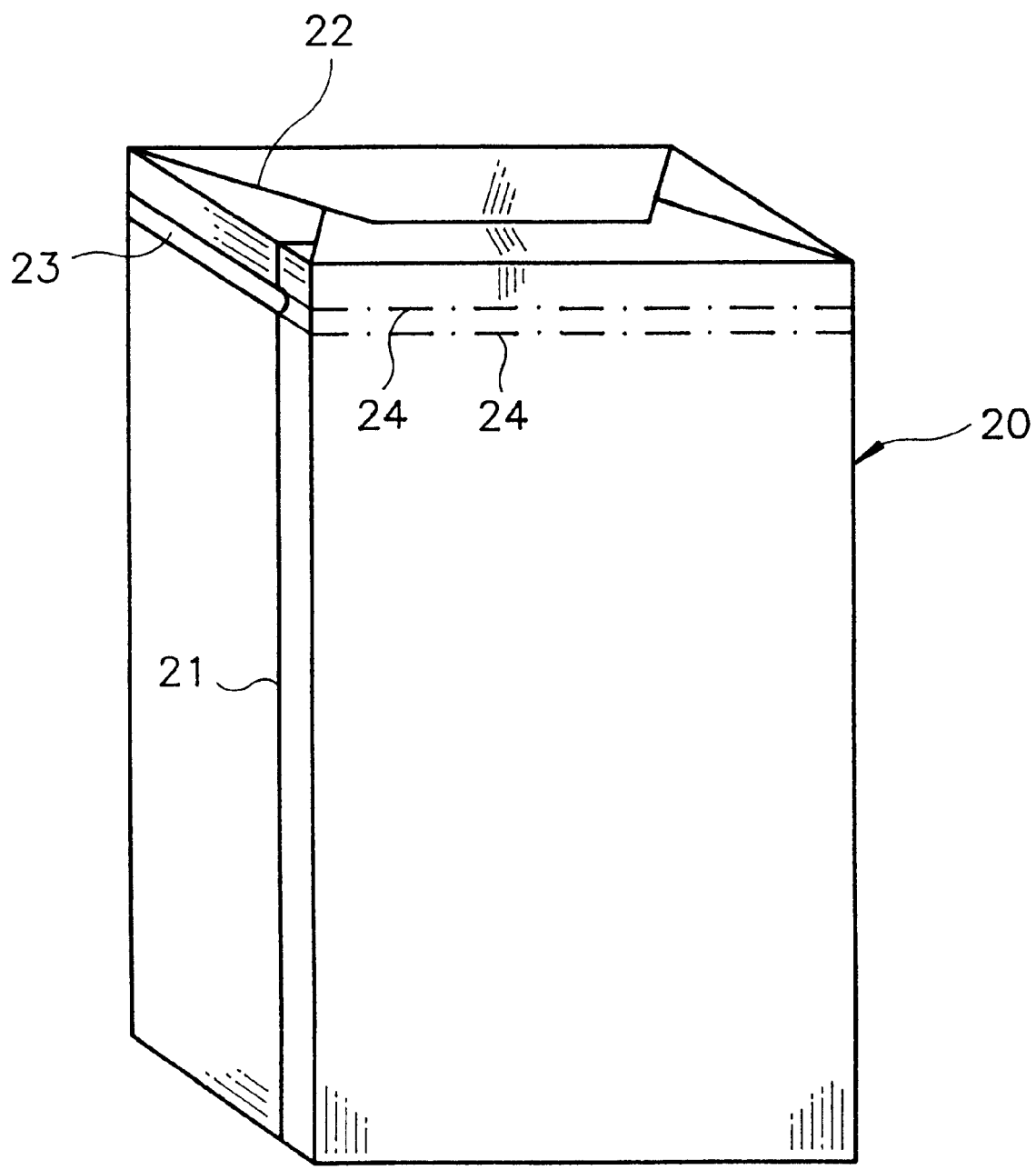
FIG. 2 shows a cigarette package made of one-layer material.

In the example of FIG. 2, the cigarette package as a whole is embodied as a one-material package 20 consisting of the material according to the invention having a thickness of at least 100 μm, in particular 120 μm. Said one-material package 20 also has a rectangular shape. The material of the package overlaps at a longitudinal weld seam 21 at which the overlapping parts are sealed. At the front faces, the packing material is laid on top of itself by folding 22, the overlapping plies being sealed. Further, an integrated ripping strip 23 is provided which is bounded by weakening lines 24 and runs once around the package near one of the front walls.

Thus, the package according to FIG. 2 consists of one ply of a vapor-tight material in which the cigarettes are contained without a further inner package. After ripping off the ripping strip 23, the ends of the cigarettes are immediately exposed.

In the example of FIGS. 3 and 4, the package 30 is also a one-material package which is embodied as two plies, though, and has a cardboard material 31 which is backed with the film 32 according to the invention. The outer shape of package 30 is the same as that of one-material package 20 of the example of FIG. 2.

The packaging material of the invention can be used to package a wide variety of materials, including, but not limited to, foods, cosmetics, detergents, paper tissues and toilet articles. This packaging film is useful for packaging any article that has requirements similar to the packaging of cigarettes, such as the need for protection of the package contents, and water vapor and gas tightness requirements.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extend required by the appended claims and the applicable rules of law.

We claim:

1. A biodegradable thermoplastic deformable material comprising a blend of starch esters based on starch with an amylopectin content of from 20% to 80% by weight as well as a degree of substitution of from 1.5 to less than 3 with polyalkylene glycol or a mixture of different polyalkylene glycols having molecular weights of from 200 to 2,000 g/mol in a mixture ratio of starch esters to polyalkylene glycol of 10:1 to 10:5 parts by weight, wherein said blend is compounded with an aliphatic polycarbonate of the formula

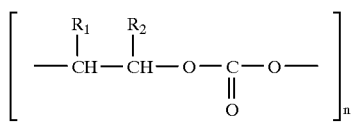

with R1, R2=hydrogen or straight or branched chain alkyl groups with 1 to 4 C atoms and wherein n equals from about 250 to 10,000 in a ratio of 95:5 to 5:95, a 0 to 30% biodegradable plasticizer and a 0–35% filler based on the total mass.

2. The biodegradable thermoplastic deformable material of claim 1, wherein the aliphatic polycarbonate is contained in a mixture ratio of 30:70 to 70:30 in the blend.

3. The biodegradable thermoplastic deformable material of claim 1, wherein the plasticizer is an ester of phthalic acid with a $C_1$–$C_{10}$ n-alkanol.

4. The biodegradable thermoplastic deformable material of claim 1, wherein the biodegradable plasticizer is a member selected from the group consisting of a polyethylene glycol, a monoester from polyethylene glycol with a $C_1$ to $C_{10}$ carboxylic acid and a diester from polyethylene glycol with a $C_1$ to $C_{10}$ dicarboxylic acid and mixtures thereof.

5. The biodegradable thermoplastic deformable material of claim 1, wherein the aliphatic polycarbontae is polypropylene carbonate.

6. The biodegradable thermoplastic deformable material of claim 1, wherein the aliphatic carbonate is polyethylene carbonate.

7. The biodegradable thermoplastic deformable material of claim 1, wherein aliphatic polycarbonate is a polyalkylene copolymer or a polyalkylene terpolymer.

8. The biodegradable thermoplastic deformable material of claim 1, wherein the starch ester is starch acetate.

9. The biodegradable thermoplastic deformable material of claim 1, wherein the starch ester has a degree of substitution of between 1.5 and 2.5

10. The biodegradable thermoplastic deformable material of claim 1, wherein the aliphatic polycarbonate has a degree of polymerization of 200–5,000.

11. A packaging method comprising blending a blend of starch esters based on starch with an amylopectin content of from 20% to 80% by weight as well as a degree of substitution of from 1.5 to less than 3 with polyalkylene glycol or a mixture of different polyalkylene glycols having molecular weights of from 200 to 2,000 g/mol in a mixture ratio of starch esters to polyalkylene glycol of 10:1 to 10:5 parts by weight for forming a blend; compounding said blend with an aliphatic polycarbonate of the formula

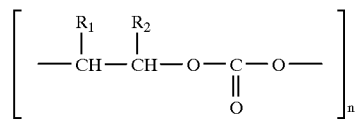

with R1, R2=hydrogen or straight or branched chain alkyl groups with 1 to 4 C atoms and wherein n equals from about 250 to 10,000 in a ratio of 95:5 to 5:95, a 0 to 30% biodegradable plasticizer and a 0–35% filler based on the total mass and thereby obtaining a biodegradable thermoplastic deformable material;

forming the biodegradable thermoplastic deformable material for packaging purposes;

packaging goods with the formed biodegradable thermoplastic deformable material.

12. The packaging method according to claim 11 wherein the goods are a member selected of the group consisting of food, cosmetics, detergent, paper tissues and toilet articles.

13. A package made of a biodegradable thermoplastic material comprising a blend of starch esters based on starch with an amylopectin content of from 20% to 80% by weight as well as a degree of substitution of from 1.5 to less than 3 with polyalkylene glycol or a mixture of different polyalkylene glycols having molecular weights of from 200 to 2,000 g/mol in a mixture ratio of starch esters to poyalkylene glycol of 10:1 to 10:5 parts by weight, wherein said blend is compounded with an aliphatic polycarbonate of the formula

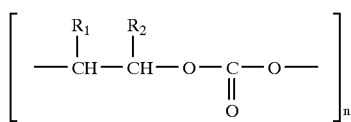

with R1, R2=hydrogen or straight or branched chain alkyl groups with 1 to 4 C atoms and wherein n equals from about 250 to 10,000 in a ratio of 95:5 to 5:95, a 0 to 30% biodegradable plasticizer and a 0–35% filler based on the total mass, and wherein said biodegradable thermoplastic deformable materials are foils, coatings or combined materials.

14. The package according to claim 13 wherein said package consists of one layer.

15. The package according to claim 13 wherein said package is a member selected from the group consisting of refillable packages, sales packages, repackaging, transport packages or components of the same.

16. The biodegradable thermoplastic deformable material of claim 1, wherein the degree of substitution is from 1.8 to 2.4.

17. The biodegradable thermoplastic deformable material of claim 1, wherein the blend contains an aliphatic saturated and/or unsaturated dicarboxylic acid and/or a hydroxycarboxylic acid, a hydroxydicarboxylic acid, or a hydroxytricarboxylic acid, with 2 to 10 C atoms in a mixture ratio of blend to acid of 100:2 to 1,000:1 parts by weight.

18. The biodegradable thermoplastic deformable material of claim 17, wherein the hydroxycarboxylic acid, the hydroxydicarboxylic acid, or the hydroxytricarboxylic acid is a tartaric acid or citric acid.

19. The biodegradable thermoplastic deformable material of claim 4, wherein the biodegradable plasticizer is a member selected from the group consisting of triethylene glycol diacetate, a glycerine triacetate and a citric acid trialkyl ester.

* * * * *